Patented Oct. 21, 1924.

1,512,783

UNITED STATES PATENT OFFICE.

CHARLES J. S. MILLER, OF FRANKLIN, PENNSYLVANIA.

COMPOSITION FOR DISPELLING FOGS.

No Drawing. Application filed December 5, 1922. Serial No. 605,107.

*To all whom it may concern:*

Be it known that I, CHARLES J. S. MILLER, a citizen of the United States, residing at Franklin, in the county of Venango and State of Pennsylvania, have invented certain new and useful Improvements in Composition for Dispelling Fogs, of which the following is a specification.

This invention has reference to a composition of matter for dispelling fog from the surface of water, and its object is to provide a composition of matter which will not materially mix with water but will dispel itself in an extremely thin film upon the surface of water to prevent the contact of air with the water to discontinue fog formation and which will at the same time be extremely volatile so as to rise above the surface of the water and dispel the fog formed thereover under such conditions lifting and dissipating the latter.

The dispelling of the fog is particularly efficient at sea or on lakes or rivers and is particularly efficient in quickly spreading over large areas of the water body.

A fog dispelling composition in accordance with this invention comprises a vegetable or mineral oil combined with ammonia, in the proportion of ninety per cent of oil and ten per cent of ammonia, or it may be formed from a vegetable or mineral oil combined with millerine, in the proportion of eighty per cent of oil and twenty per cent of millerine, the latter consisting of ten per cent of ammonia and ten per cent of naptha or motor gasoline. The specific gravity of the naptha being from sixty-two or eighty-two per cent and that of the gasoline from sixty-eight to seventy-two per cent.

The fluid is distributed upon the surface of the water, seas, lakes, rivers, swamps, etc., by suitable means as case demands, that is, it is projected in a container or projectile made of suitable material, and so constructed that when the container or projectile strikes water the fluid is liberated thereon, and thereover, said container or projectile containing said fluid to be projected from the bow of a vessel or otherwise, at desired distances to dispel the fog, said container or projectile to be projected by air tube or cannon, or springs, or other suitable means, or as otherwise needed, upon said waters, by spraying or other suitable arrangement.

The composition is dispelled over the surface of the water by the impact of the container on the surface of the water rupturing a relatively fragile paper or like covering ordinarily confining the liquid in the container, so that the liquid is distributed over the surface of the water, thus forming a film or blanket covering the surface of the water, thus preventing the contact of air with the water causing the discontinuance of fog formation, or as the composition is extremely volatile it will rise above the surface of the water and dispel the fog formed thereover under such conditions lifting and dissipating the latter.

The solution consists broadly of a base of mineral or vegetable oil in combination with certain percentages of a volatile substance such as ether or naptha or millerine, with the mineral or vegetable oil predominating, the oil serving as a vehicle capable of spreading over great distances on the surface of the water and the volatile matter such as naptha or ether or millerine quickly dissipating through the surrounding atmosphere to spread therethrough and lift and dissipate the fog.

What is claimed is:—

1. A composition for preventing and dissipating fogs overlying bodies of water, comprising a mixture of oil and a volatile liquid, for free dissipation in a thin film-like form over the surface of the body of water overlaid by the fog to prevent the air contacting with the water and of a characteristic to rise to dispel the fog.

2. A composition for preventing and dissipating fogs overlying bodies of water, which consists of oil, ammonia and volatile petroleum.

3. A composition for preventing and dissipating fogs overlying bodies of water, which consists of oil, ammonia and volatile petroleum, said petroleum product being in the proportion of ten per cent of the entire mixture.

In testimony whereof, I affix my signature hereto.

CHARLES J. S. MILLER.